United States Patent [19]

White

[11] 4,399,539
[45] Aug. 16, 1983

[54] AUTO-IONIZATION PUMPED ANTI-STOKES RAMAN LASER

[75] Inventor: Jonathan C. White, Lincroft, N.J.

[73] Assignee: Bell Telephone Laboratories, Incorporated, Murray Hill, N.J.

[21] Appl. No.: 416,381

[22] Filed: Sep. 9, 1982

[51] Int. Cl.$^3$ .............................................. H01S 3/30
[52] U.S. Cl. ........................................ 372/3; 372/70; 372/56
[58] Field of Search ..................... 372/3, 69, 70, 5, 56; 307/425

[56] References Cited

U.S. PATENT DOCUMENTS 4,183,795 1/1980 Bloom et al. ................. 204/157.1 R

OTHER PUBLICATIONS

"Observation of Stimulated Anti-Stokes Raman Scattering in Inverted Atomic Iodine", by Carman et al., Phys. Rev. Lett., vol. 33, No. 4, Jul. 22, 1974.
um–Ion Soft X-Ray Laser" Mani et al., Jour. Appl. Physic vol. 47, No. 7, Jul. 1976.
"Inversion of the Resonance Line of Sr+ Produced by Optically Pumping Sr Atoms" Green et al., Physical Rev. A, vol. 25, No. 2, Feb. 1982.
"Autoionization Pumped Laser", Bokor et al., Phys. Rev. Lett. vol. 48, No. 18, 4/82.
"The Photo Avalanche, A new phenomenon in $Pr^{3+}$-based infared quantum counters", Chivian et al., Appl. Phys. Lett. (35)(2) Jul. 79.

Primary Examiner—William L. Sikes
Assistant Examiner—Léon Scott, Jr.
Attorney, Agent, or Firm—Erwin W. Pfeifle

[57] ABSTRACT

An auto-ionization pumped anti-Stokes Raman laser is disclosed which is capable of creating a population inversion between the ground state and a metastable state of an ionic lasing material. The lasing material is first pumped above a metastable energy level, where it subsequently falls via auto-ionization back to the metastable level. A second laser pump is employed to move the population from the metastable state to a region near an intermediate state of the lasing material. The population subsequently falls back to the initial ground ionic state, thereby creating the anti-Stokes Raman emission.

5 Claims, 4 Drawing Figures

AUTO-IONIZATION PUMPED ANTI-STOKES RAMAN LASER

BACKGROUND OF THE INVENTION

1. Field of the Invention

The present invention relates to an auto-ionization pumped anti-Stokes Raman laser and, more particularly, to an auto-ionization pumped anti-Stokes Raman laser capable of storing an ionic population inversion in a metastable state, that is, a non-dipole-allowed transition-to-ground state of an ion.

2. Description of the Prior Art

An anti-Stokes Raman laser may be defined as stimulated anti-Stokes Raman emission induced by a pump laser between two levels of the same parity in which a population inversion exists between the upper and lower Raman states. Such laser devices are particularly attractive since they are tunable by tuning the pump laser and, because the upper Raman state is often a metastable level, large inversion densities and high anti-Stokes output energies are possible. Early work in this area is reported in an article entitled "Observation of Stimulated Anti-Stokes Raman Scattering in Inverted Atomic Iodine" by R. L. Carman et al. appearing in *Physical Review Letters*, Vol. 33, No. 4, July 22, 1974 at pp. 190–193. As described therein, measurable gain in inverted I atoms may be obtained, where the I* ($5p^5 2P^0_{\frac{1}{2}}$) state is populated by flash photolysis of trifluoromethyliodide ($CF_3I$). The anti-Stokes Raman signal may be observed by pumping this inversion with the fundamental of a Nd:YAC (yttrium aluminum garnet) laser at 1.06 $\mu$m and probing with a broadband dye laser. The article goes on to state, however, that superfluorescent emission at the nonresonant anti-Stokes wavelength was not observed during these experiments.

The key to the anti-Stokes Raman laser is the ability to create population inversions between states of the same parity. In many cases, for storage considerations and/or ease of excitation, the creation of a population inversion between states of the same parity is accomplished by creating an inversion in a metastable state with respect to the ground state of the species. Further, to avoid having the stored population drain away, no dipole allowed transitions should exist between the metastable state and the ground state.

For many applications, in particular VUV tunable lasers, auto-ionization pumping to such storage levels in ions is particularly useful. That is, the population may be pumped to a region bove a metastable level, where it will automatically ionize and fall back to the metastable level. Prior work involving auto-ionization techniques was concerned with creating population inversions in dipole-allowed states to ground, as disclosed in the article "Inversion of the Resonance Line of $Sr^+$ Produced by Optically Pumping Sr Atoms" by W. R. Green et al. appearing in *Optics Letters*, Vol. 2, No. 5, May 1978 at pp. 115–116. Another article, entitled "Autoionization-Pumped Laser" by J. Bokor et al. appearing in *Physical Review Letters*, Vol. 48, No. 18, May 3, 1982 at pp. 1242–1245, discusses subsequent work in this area and describes a two-photon pumped inversion into a dipole-allowed state.

The problem with pumping into dipole-allowed states is that the population will naturally drain away into lower states, tending to dissipate the population available for lasing.

SUMMARY OF THE INVENTION

The present invention relates to an auto-ionization pumped anti-Stokes Raman laser and, more particularly, to an auto-ionization pump anti-Stokes Raman laser capable of storing an ionic population inversion in a metastable state, that is, a non-dipole-allowed transition-to-ground state of an ion.

It is an aspect of the present invention to employ certain materials (e.g., Ba, Ca, Sr) capable of being auto-ionized into metastable states which can then be easily pumped, resulting in stimulated Raman scattering, where the energy levels of these ions are suitably positioned for vacuum ultraviolet (VUV) and extreme ultraviolet (XUV) anti-Stokes emission.

Yet another aspect of the present invention is to employ the atom's natural tendency to emit laser radiation along strong electric dipole transitions to populate levels which can subsequently be auto-ionized to yield the desired metastable ion. This technique thus permits the ready excitation of an energy level of the same parity as the ground state neutral atom.

Other and further aspects of the present invention will become apparent during the course of the following description and by reference to the accompanying drawings.

DETAILED DESCRIPTION

For the purposes of the present discussion, calcium will be employed as the lasing medium of the present invention. It is to be understood that there exist many other elements, for example, barium or strontium, which may be employed and will differ from calcium only with respect to the various energy levels related thereto.

Figure 1:
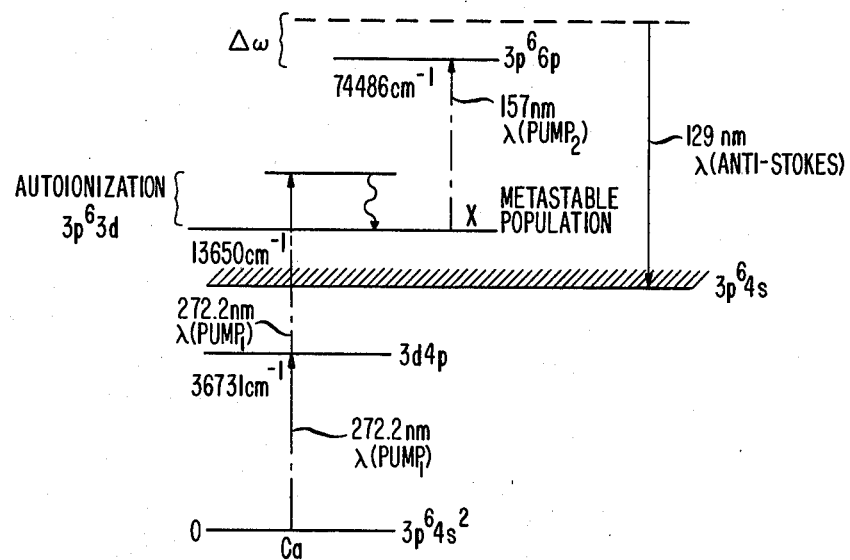
FIG. 1 illustrates the pertinent energy levels of calcium for anti-Stokes Raman lasing employing a first auto-ionization technique in accordance with the present invention.

Referring to FIG. 1, ground state calcium is first pumped with a 272.2 nm laser to the 3d4p energy level, moving one of the 4s electrons to the 4p orbital. The same 272.2 nm laser is activated once again to strip off the 4p electron and drive the energy state upward beyond the $3p^6 3d$ energy level. At this point, auto-ionization occurs, that is, the double-pumped population will ionize by ejecting the 4p electron, thereby decaying via a one electron ionization process to the nearest energy level, which is, as shown in FIG. 1, the $3p^6 3d$ energy level, a metastable state with respect to the ground state. Since no ground state ions are created by this process, the excited metastable state is inverted with respect to ground ionic state. The location of the metastable calcium population is illustrated in the energy level diagram of FIG. 1. As further shown in FIG. 1, absorption of a strong pumping field tuned near $\lambda = 157$ nm resonantly couples the calcium metastable and ground states near the $3p^66p$ energy level. Therefore, in accordance with the present invention, stimulated anti-Stokes Raman emission at 129 nm will result, within the calcium ion, as illustrated in FIG. 1.

Figure 2:
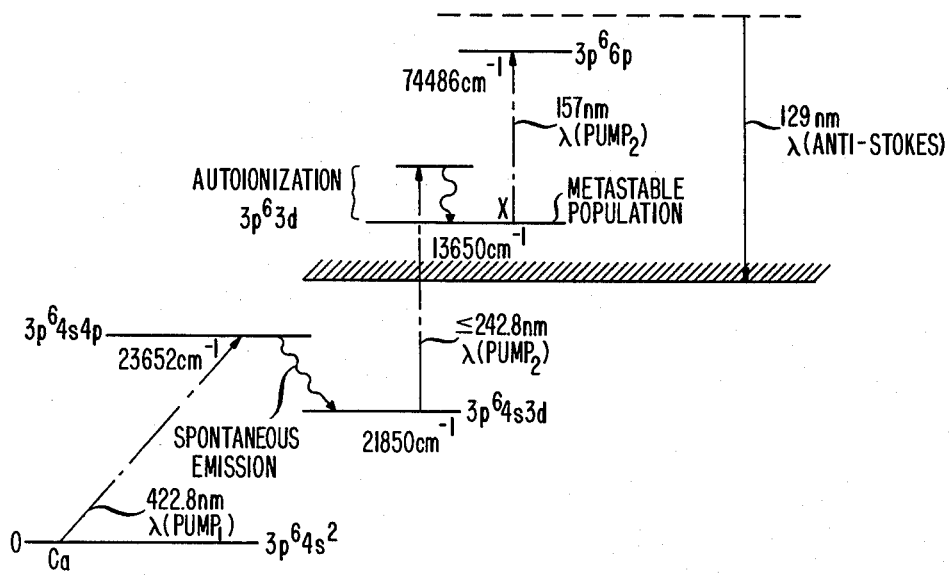
FIG. 2 illustrates the pertinent energy levels of calcium for anti-Stokes Raman lasing employing an alternative auto-ionization technique in accordance with the present invention.

An alternative process in accordance with the present invention is illustrated in the energy level diagram of FIG. 2. The process illustrated in FIG. 2 utilizes the atom's natural tendency, as mentioned hereinabove, to emit laser radiation along strong electric dipole transitions to populate levels which are then conveniently ionized to yield the desired metastable ion. This technique thus permits the ready excitation of an energy level of the same parity as the ground state neutral atom. As shown, the ground state calcium is pumped via a $\lambda = 422.8$ nm laser to move one of the 4s electrons to the 4p orbital, thus occupying the $3p^64s4p$ energy level. The transition from the $3p^64s4p$ energy level to the $3p^64s3d$ energy level shown in FIG. 2 occurs via amplified spontaneous emission, that is, the electron occupying the 4p orbital will naturally follow the strong dipole transition to the 3d orbital.

From the $3p^64s3d$ level, a second pump laser at approximately 242.8 nm is employed to pump the population above the $3p^63d$ level by removing the 4s electron from the atom. As discussed hereinabove in association with FIG. 1, the final ionic population, via auto-ionization, will occupy the $3p^63d$ metastable energy level. Therefore, as described hereinabove in association with FIG. 1, a 157 nm pump laser may be employed to resonantly couple the calcium metastable state with the ground state near the $3p^66p$ energy level, where, as before, anti-Stokes Raman emission will occur at 129 nm.

Figure 3:
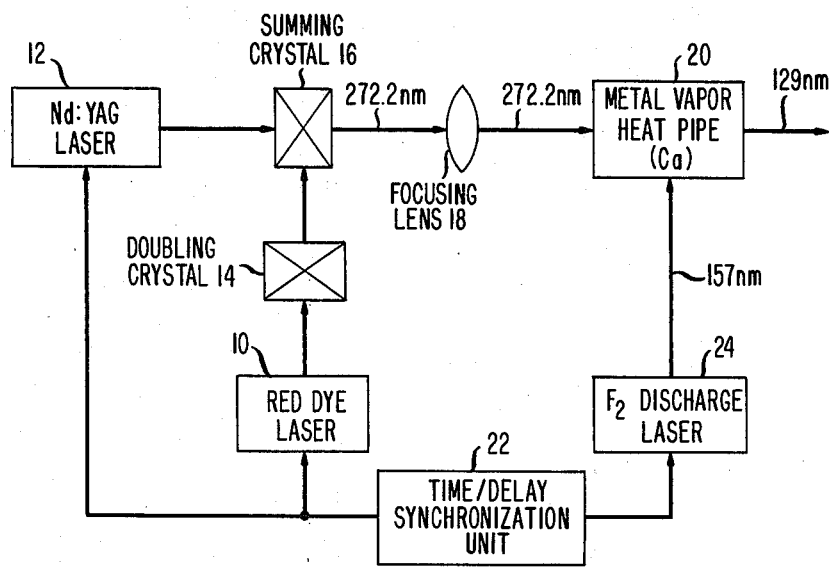
FIG. 3 illustrates a block diagram of an exemplary embodiment of an auto-ionization anti-Stokes Raman laser associated with the energy level diagram of FIG. 1 and formed in accordance with the present invention.

An exemplary experimental apparatus capable of performing the process illustrated in FIG. 1 is shown in FIG. 3. The first pump frequency of $\lambda = 272.2$ nm is formed from a red dye laser 10 and a Nd:YAG laser 12. Red dye laser 10 is applied as an input to a doubling crystal 14, for example, a $KH_2PO_4$(KDP) doubling crystal, which functions to double the frequency of the radiation applied as an input thereto. The output of doubling crystal 14 is subsequently applied as a first input to a summing crystal 16, wherein the output of Nd:YAG laser 12 is applied as the second input to summing crystal 16. The output of summing crystal 16 will be the sum of the frequencies applied as separate inputs thereto, and in this particular embodiment of the present invention, the output will be of wavelength 272.2 nm, the wavelength necessary to raise the ground state calcium to the 3d4p energy level, as illustrated in FIG. 1.

In accordance with this particular embodiment of the present invention, the 272.2 nm pulse must be very precise, that is, not vary more than a few wave numbers above or below 272.2 nm. Therefore, the output of summing crystal 16 is passed through a focusing lens 18, for example, a $CaF_2$ lens, before being applied as an input to a metal vapor heat pipe oven 20 containing the vaporized calcium at a predetermined pressure. Heat pipe oven 20 may be a simple stainless-steel oven with cold, unaligned $CaF_2$ windows. An inert buffer gas, for example, argon or helium, may be employed to prevent calcium vapor condensation on the windows.

As discussed hereinabove in association with FIG. 1, the calcium must be "double pumped" with the 272.2 nm laser pulse. In the embodiment illustrated in FIG. 3, this is accomplished by employing a time delay/synchronization unit 22. Time delay/synchronization unit 22 initiates the action of both red dye laser 10 and Nd:YAG laser 12, and after a predetermined time period, will reactivate both red dye laser 10 and Nd:YAG laser 12 to produce the second pulse at 272.2 nm, thus raising the vaporized calcium above the $3p^63d$ orbital level, as shown in FIG. 1. In accordance with this embodiment of the present invention, the timing between pulses is critical, that is, the second 272.2 nm pulse must arrive immediately after the first pulse, before the energy at the 3d4p energy level has the opportunity to radiate downward to a lower energy state.

Subsequent to the arrival of the second 272.2 nm pulse at metal vapor heat pipe oven 20, time delay/synchronization unit 22 initializes an $F_2$ discharge laser 24 which is capable of producing the necessary 157 nm wavelength to pump the calcium near the 3p6p energy level. The output of $F_2$ discharge laser 24 is subsequently applied as an input to metal vapor heat pipe oven 20 and, in accordance with the present invention as discussed hereinabove in association with FIG. 1, heat pipe 20 will produce as an output anti-Stokes Raman emission at 129 nm.

Figure 4:
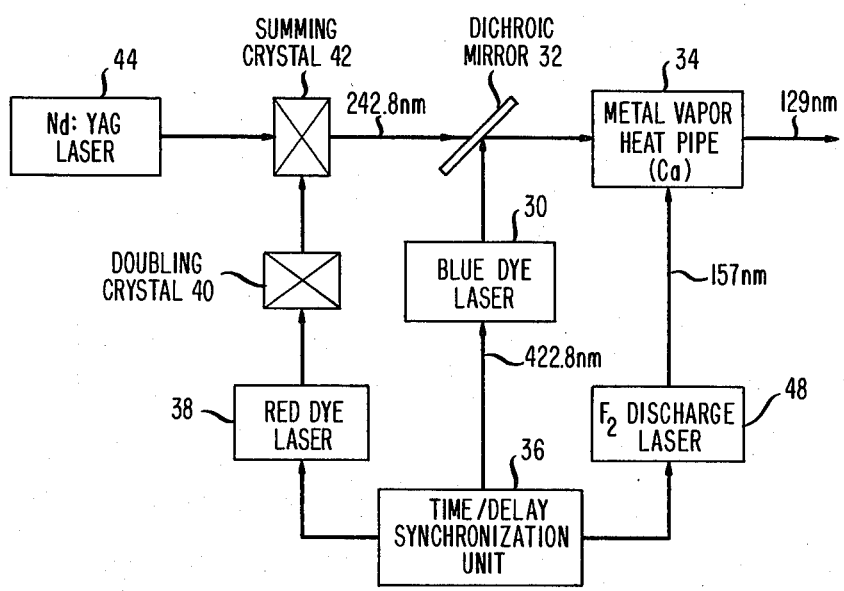
FIG. 4 illustrates a block diagram of an exemplary embodiment of an auto-ionization anti-Stokes Raman laser associated with the energy level diagram of FIG. 2 and formed in accordance with the present invention.

An alternative embodiment of the present invention, associated with the process illustrated in FIG. 2, is shown in FIG. 4. The first laser pump, at $\lambda = 422.8$ nm is supplied by a blue dye laser 30. The 422.8 nm pulse passes through a dichroic mirror 32 and is subsequently applied as an input to a metal vapor heat pipe oven 34 containing, as before, vaporized calcium at a predetermined pressure. As discussed hereinbove in association with FIG. 2, the 422.8 nm pulse will move the calcium to the $3p^64s4p$ energy level. Upon reaching this level, spontaneous emission will occur and the calcium will radiate downward to the $3p^64s3d$ energy level.

The necessary 242.8 nm pulse is supplied by a red dye laser 38 which is activated by a time delay/synchronization unit 36. The output of red dye laser 38 is passed through a doubling crystal 40 and subsequently applied as a first input to a summing crystal 42. The output of a Nd:YAG laser 44 is applied as the second input to summing crystal 42, where the output thereof is the sum of the frequencies applied as inputs thereto, in this example, approximately 242.8 nm. The output of summing crystal 42 is subsequently passed undeflected through dichroic mirror 32 and applied as an input to metal vapor heat pipe oven 34. As seen by reference to FIG. 2, the 242.8 nm pulse moves the calcium population above the $3p^63d$ energy level. The laser frequency required at this stage is not critical and may, in fact, be a few hundred Å below 242.8 nm, the only requirement being that the calcium is moved to at least the $3p^63d$ metastable level. Therefore, the pump frequency of 242.8 nm is an approximation only.

Subsequent to the application of the 242.8 nm pulse, time delay/synchronization means 36 activates an $F_2$ discharge laser 48. $F_2$ discharge laser 48, like $F_2$ discharge laser 24 of FIG. 3, emits a 157 nm pulse which is applied as an input to metal vapor heat pipe 34. As described hereinabove in association with FIG. 2, upon the application of the 157 nm pulse, the calcium will emit anti-Stokes Raman radiation at 129 nm.

What is claimed is:

1. An auto-ionization pumped anti-Stokes Raman laser comprising
   a Raman lasing medium including a ground state, an intermediate state, and at least one metastable state of an ion;
   a first lasing source capable of creating a transition from the ground state of the Raman lasing medium to a predetermined level above a metastable state of said Raman lasing medium wherein said Raman lasing medium immediately ionizes and falls to said metastable state; and
   a second lasing source capable of creating a transition from said metastable state to a predetermined region near said intermediate state, thereby creating a Raman lasing output from said predetermined region to said ground ionic state.

2. An auto-ionization anti-Stokes Raman laser formed in accordance with claim 1 wherein said laser further comprises
   time/delay synchronization means for separately initiating both the first lasing source and the second lasing source such that the output from said first lasing source arrives at the Raman lasing medium a predetermined time interval before the output from said second lasing source.

3. an auto-ionization anti-Stokes Raman laser formed in accordance with claim 2 wherein the first lasing source comprises
   dye pumped lasing means responsive to the time delay/synchronization means for producing a lasing emission at a first wavelength;
   a doubling crystal responsive to said lasing emission produced by said dye pumped lasing means for generating a lasing emission at the second harmonic thereof comprising a second wavelength equal to one-half of said first wavelength;
   Nd:YAG lasing means responsive to said time delay/synchronization means for producing a lasing emission at a third wavelength; and
   a summing crystal responsive to the second wavelength produced by the doubling crystal and the third wavelength produced by the Nd:YAG lasing means to produce as an output a fourth wavelength equal to the sum of said second and third wavelengths, the output of the summing crystal being the output of said first lasing source.

4. An auto-ionization anti-Stokes Raman laser formed in accordance with claim 2 wherein the first lasing source comprises
   first dye pumped lasing means responsive to the time delay/synchronization means for producing a lasing emission at a first wavelength and applying the lasing emission as a first input to the Raman lasing medium;
   second dye pumped lasing means responsive to said time delay/synchronization means for producing a lasing emission at a second wavelength;
   a doubling crystal responsive to the lasing emission produced by the second dye pumped lasing means for generating a lasing emission at the second harmonic thereof comprising a third wavelength equal to one-half of said second wavelength;
   Nd:YAG lasing means responsive to said time delay/synchronization means for producing a lasing emission at a fourth wavelength;
   a summing crystal responsive to both the third wavelength produced by the doubling crystal and the fourth wavelength produced by the Nd:YAG lasing means to produce as an output a fifth wavelength equal to the sum thereof, wherein the fifth wavelength is applied as a second input to said Raman lasing medium.

5. an auto-ionization anti-Stokes Raman laser formed in accordance with claim 2 wherein the second lasing source comprises
   $F_2$ discharge lasing means responsive to the time dela/synchronization means for creating the transition from a metastable state to an intermediate state of the Raman lasing medium.

* * * * *